US009674874B2

(12) United States Patent
Wang et al.

(10) Patent No.: US 9,674,874 B2
(45) Date of Patent: *Jun. 6, 2017

(54) MAC RESET AND RECONFIGURATION

(71) Applicant: INTERDIGITAL PATENT HOLDINGS, INC., Wilmington, DE (US)

(72) Inventors: Jin Wang, Princeton, NJ (US); Mohammed Sammour, Alrabieh-Amman (JO)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/874,383

(22) Filed: Oct. 3, 2015

(65) Prior Publication Data

US 2016/0029413 A1    Jan. 28, 2016

Related U.S. Application Data

(60) Continuation of application No. 14/101,311, filed on Dec. 9, 2013, now Pat. No. 9,155,111, which is a division of application No. 12/536,958, filed on Aug. 6, 2009, now Pat. No. 8,625,486.

(60) Provisional application No. 61/087,443, filed on Aug. 8, 2008.

(51) Int. Cl.
*H04W 74/08* (2009.01)
*H04L 1/18* (2006.01)

(52) U.S. Cl.
CPC ....... *H04W 74/0833* (2013.01); *H04L 1/1812* (2013.01)

(58) Field of Classification Search
None
See application file for complete search history.

(56) References Cited

U.S. PATENT DOCUMENTS

| 6,978,143 | B1 | 12/2005 | Vialen |
| 7,286,563 | B2 | 10/2007 | Chang et al. |
| 7,580,388 | B2 | 8/2009 | Kim |
| 7,657,275 | B2 | 2/2010 | Kasturi et al. |

(Continued)

FOREIGN PATENT DOCUMENTS

| CN | 101304375 A | 11/2008 |
| CN | 101304376 A | 11/2008 |

(Continued)

OTHER PUBLICATIONS

3rd Generation Partnership Project (3GPP), R2-082230, "Remaining Issues on RACH Modelling", Panasonic, 3GPP TSG RAN WG2 Meeting #62, Kansas City, USA, May 5-9, 2008, 4 pages.

(Continued)

*Primary Examiner* — Alex Skripnikov
(74) *Attorney, Agent, or Firm* — Condo Roccia Koptiw LLP

(57) ABSTRACT

A method and apparatus for reconfiguring a medium access control (MAC) entity in a wireless transmit receive unit (WTRU). The method and apparatus includes the WTRU transmitting a MAC reconfiguration request, the WTRU receiving a MAC reconfiguration command including updated MAC parameter values and the WTRU reconfiguring a MAC entity based on the updated MAC parameter values in the MAC reconfiguration command.

10 Claims, 14 Drawing Sheets

(56) References Cited

U.S. PATENT DOCUMENTS

| | | | |
|---|---|---|---|
| 7,768,962 | B2 | 8/2010 | Kubota et al. |
| 7,912,471 | B2 | 3/2011 | Kodikara et al. |
| 7,957,298 | B2 | 6/2011 | Yi et al. |
| 8,102,802 | B2 | 1/2012 | Ratasuk et al. |
| 2002/0001314 | A1* | 1/2002 | Yi .................. H04L 1/0079 370/469 |
| 2004/0052229 | A1 | 3/2004 | Terry et al. |
| 2004/0153896 | A1 | 8/2004 | Jang |
| 2004/0208160 | A1 | 10/2004 | Petrovic et al. |
| 2005/0083876 | A1 | 4/2005 | Vialen et al. |
| 2005/0249140 | A1 | 11/2005 | Lee et al. |
| 2005/0250504 | A1 | 11/2005 | Mikola |
| 2005/0266846 | A1 | 12/2005 | Kim |
| 2006/0056365 | A1* | 3/2006 | Das .................. H04W 28/22 370/338 |
| 2006/0120404 | A1 | 6/2006 | Sebire et al. |
| 2006/0251169 | A1 | 11/2006 | Wang |
| 2007/0097937 | A1 | 5/2007 | Kubota et al. |
| 2008/0101283 | A1 | 5/2008 | Calhoun et al. |
| 2008/0188224 | A1 | 8/2008 | Pani et al. |
| 2008/0279194 | A1 | 11/2008 | Tseng |
| 2009/0046641 | A1 | 2/2009 | Wang et al. |
| 2009/0086657 | A1 | 4/2009 | Alpert et al. |
| 2012/0044880 | A1 | 2/2012 | Sun et al. |
| 2013/0023269 | A1 | 1/2013 | Wang et al. |

FOREIGN PATENT DOCUMENTS

| | | |
|---|---|---|
| CN | 101304416 A | 11/2008 |
| EP | 1465369 A1 | 10/2004 |
| JP | 2002-502206 A | 1/2002 |
| JP | 2005-539468 A | 12/2005 |
| JP | 2009-514474 A | 4/2009 |
| JP | 2009-542100 A | 11/2009 |
| JP | 2010-518695 A | 5/2010 |
| WO | WO 2006/135482 A1 | 12/2006 |

OTHER PUBLICATIONS

3rd Generation Partnership Project (3GPP), R2-083142, "Discussion on MAC Reset and Reconfiguration", Ericsson, 3GPP TSG-RAN WG2 Meeting #62bis, Warsaw, Poland, Jun. 30-Jul. 4, 2008, pp. 1-2.

3rd Generation Partnership Project (3GPP), R2-083143, "Text Proposal on MAC Reset and Reconfiguration", Ericsson, 3GPP TSG-RAN2 Meeting #62bis, Warsaw, Poland, Jun. 30-Jul. 4, 2008, pp. 1-4.

3rd Generation Partnership Project (3GPP), R2-083253, "A Simple Counter Based Random Access Procedure", Texas Instruments, Inc., 3GPP TSG-RAN WG2 Meeting #62bis, Warsaw, Poland, Jun. 30-Jul. 4, 2008, 5 pages.

3rd Generation Partnership Project (3GPP), Tdoc R2-081183 Update of R2-081129, "Layer 1 Parameters-Location within RRC Signalling", 3GPP TSG-RAN WG2#61, Sorrento, Italy, Feb. 11-15, 2008, 16 pages.

3rd Generation Partnership Project (3GPP), Tdoc R2-082029, "Random Access Procedure Model", Ericsson (Rapporteur), 3GPP TSG-RAN WG2 #61bis, Shenzhen, China, Mar. 31-Apr. 4, 2008, 4 pages.

3rd Generation Partnership Project (3GPP), TS 36.321 V8.2.0, "Technical Specification Group Radio Access Network, Evolved Universal Terrestrial Radio Access (E-UTRA) Medium Access Control (MAC) Protocol Specification (Release 8)", May 2008, pp. 1-33.

3rd Generation Partnership Project (3GPP), TS 36.321 V8.6.0, "Technical Specification Group Radio Access Network, Evolved Universal Terrestrial Radio Access (E-UTRA) Medium Access Control (MAC) Protocol Specification (Release 8)", Jun. 2009, pp. 1-47.

3rd Generation Partnership Project (3GPP), TS 36.331 V8.2.0, "Technical Specification Group Radio Access Network, Evolved Universal Terrestrial Radio Access (E-UTRA) Radio Resource Control (RCC), Protocol Specification (Release 8)", May 2008, pp. 1-151.

3rd Generation Partnership Project (3GPP), TS 36.331 V8.6.0, "Technical Specification Group Radio Access Network, Evolved Universal Terrestrial Radio Access (E-UTRA) Radio Resource Control (RRC) (Release 8)", Jun. 2009, pp. 1-207.

* cited by examiner

MAC RESET AND RECONFIGURATION

CROSS-REFERENCE TO RELATED APPLICATIONS

This application is a continuation of U.S. patent application Ser. No. 14/101,311, titled "MAC Reset and Reconfiguration", filed Dec. 9, 2013, which is a divisional of U.S. patent application Ser. No. 12/536,958, titled "MAC Reset and Reconfiguration", filed on Aug. 6, 2009, issued as U.S. Pat. No. 8,625,486 on Jan. 7, 2014, which claims the benefit of U.S. Provisional Application No. 61/087,443, titled "MAC Reset and Configuration in LTE", filed on Aug. 8, 2008, the contents of all of which being herby incorporated by reference in their respective entirety as if fully set forth herein, for all purposes.

FIELD OF INVENTION

This application is related to wireless communications.

BACKGROUND

Goals of the 3rd Generation Partnership Project (3GPP) Long Term Evolution (LTE) program include developing new technology, new architecture and new methods for new LTE settings and configurations in order to provide improved spectral efficiency, reduced latency, better utilizing the radio resource to bring faster user experiences and richer applications and services with less cost.

FIG. 1 shows an overview of an Evolved Universal Mobile Telecommunications System (UMTS) Terrestrial Radio Access Network (E-UTRAN) 100 in accordance with the prior art. As shown in FIG. 1, E-UTRAN 100 includes three eNodeBs (eNBs) 102, however, any number of eNBs may be included in E-UTRAN 100. The eNBs 102 are interconnected by an X2 interface 108. The eNBs 102 are also connected by an S1 interface 106 to the Evolved Packet Core (EPC) 104 that includes a Mobility Management Entity (MME) 112 and a Serving Gateway (S-GW) 110.

FIG. 2 shows an LTE user-plane protocol stack 200 in accordance with the prior art. The protocol stack 200 is located in a wireless transmit receive unit (WTRU) 210 and includes the packet data control protocol (PDCP) 202, the radio link control (RLC) 204, the medium access control (MAC) 206 and the physical layer (PHY) 208. The protocol stack 200 may also reside in an eNB (not shown).

FIG. 3 shows an LTE control plane protocol stack 300 of the WTRU 210 of FIG. 2. The control plane protocol stack 300 includes the non-access stratum (NAS) 302 and a radio resource control (RRC) 304. Also included are the PDCP 306, RLC 308 and MAC 310, which together form the layer 2 sublayer 312.

The MAC entity may be reset or reconfigured as required. A reconfiguration occurs when one or more of the MAC entity's parameters, such as random access channel (RACH) parameters, are modified. A MAC reset procedure may be performed at handover, cell-reselection, radio resource control (RRC) connection re-establishment and upon the WTRU moving from RRC connected state to RRC idle state.

The parameters for a MAC entity may be reconfigured by the upper layers. When a RACH parameter is reconfigured by an upper layer, the WTRU may start using new RACH parameters the next time the random access procedure is initiated. This may include if an available set of physical random access channel (PRACH) resources for the transmission of the random access preamble and their corresponding radio access-radio network temporary identifiers (RA-RNTIs) are modified, for example. This may also include modifying groups of random access preambles and a set of available random access preambles in each group. Other parameters may be modified, such as the thresholds required for selecting a group of random access preambles, the parameters required to derive the transmission time interval (TTI) window, the power-ramping factor, the maximum preamble transmission power, the initial preamble transmission power, the maximum number of message hybrid automatic retransmission request (HARQ) transmissions, the preamble transmission counter, and the backoff parameter, for example. For other modified parameters, the WTRU may start using the reconfigured value of the parameter immediately.

FIG. 4 shows a method of resetting a MAC entity 400 in accordance with the prior art. In step 402, the WTRU flushes all hybrid automatic repeat request (HARQ) buffers. At step 404, the WTRU initializes a counter, CURRENT_TX_NB, which counts the number of transmissions that have taken place for the MAC protocol data unit (PDU) currently in the buffer. The WTRU sets the counter to zero for all HARQ processes. At step 406, the disassembly and demultiplexing entity are flushed. At step 408, the WTRU will detect if a random access procedure is ongoing. If so, at step 410, the WTRU will abort the ongoing random access procedure. At step 412, the WTRU will flush a message buffer, and at step 414, it will initialize the preamble transmission counter to zero. At step 416, the WTRU may consider the contention resolution timer to be expired and discard the cell radio network temporary identifier (C-RNTI). The contention resolution timer specifies the number of consecutive physical downlink control channel (PDCCH) subframes that the WTRU monitors on the PDCCH after the uplink message containing the C-RNTI MAC control element or the uplink message associated with WTRU contention resolution identity submitted from a higher layer is transmitted. At step 418, the WTRU may adjust a number of timers, such as the time alignment timer, the on-duration timer, the DRX inactivity timer, the DRX retransmission timer, the DRX short cycle timer, the periodic buffer status report (BSR) timer and the power head room (PHR) timer, for example.

SUMMARY

A method and apparatus are disclosed for resetting and reconfiguring a medium access control (MAC) entity in a wireless transmit receive unit (WTRU). This may include a transmitter in a WTRU transmitting a MAC reset or reconfiguration request. A receiver in a WTRU may receive a MAC reset or reconfiguration command that includes new MAC parameter values. The WTRU may reconfigure the MAC entity based on the new MAC parameter values taken from the MAC reconfiguration command or reset all the MAC parameters.

Embodiments contemplate one or more devices that may be configured to reset a medium access control (MAC) entity. In one or more embodiments, a wireless transmit/receive device may comprise a processor, the processor may be configured, at least in part, to receive a MAC reset indication from an entity of a layer higher than the MAC layer. The processor may be configured to stop one or more timers upon receipt of the reset indication. The processor may be configured to consider a Timing Alignment Timer to be expired upon receipt of the reset indication. The processor may be configured to stop an ongoing random access channel (RACH) process upon receipt of the reset indication.

Embodiments contemplate that a wireless transmit receive unit (WTRU) may be configured to reset a medium access control (MAC) entity. The WTRU may comprise a processor. The processor may be configured to detect a MAC reset indication. The processor may be configured stop all timers of a MAC layer upon the MAC reset being indicated. The processor may be configured to consider a Timing Alignment Timer to be expired upon the MAC reset being indicated. The processor may be configured to stop an ongoing random access channel (RACH) process upon the MAC reset being indicated.

Embodiments contemplate one or more techniques for resetting a medium access control (MAC) entity. In one or more techniques may comprise, receiving a MAC reset indication from an entity of a layer higher than the MAC layer. Techniques may comprise stopping one or more timers upon receipt of the reset indication. Techniques may comprise considering a Timing Alignment Timer to be expired upon receipt of the reset indication. Techniques may comprise stopping an ongoing random access channel (RACH) process upon receipt of the reset indication.

Embodiments contemplate one or more techniques for determining a MAC reset requirement. One or more techniques may comprise detecting at least one of a predetermined number of random access channel (RACH) attempts or a radio link failure. Techniques may comprise indicating a random access problem to one or more layers higher than a MAC layer upon the detection of at least one of the predetermined number of random access channel (RACH) attempts or the radio link failure. Techniques may comprise indicating a MAC layer reset requirement to the one or more layers higher than the MAC layer upon the detection of at least one of a predetermined number of random access channel (RACH) attempts or a radio link failure.

Embodiments contemplate one or more techniques that may be performed by a wireless transmit receive unit (WTRU). Techniques may include detecting, at the WTRU, a predetermined number of random access channel (RACH) attempts. Techniques may include receiving a MAC reset command from at least one of one or more higher layers than a MAC layer. Techniques may include suspending transmission of at least one protocol data unit (PDU) of a MAC entity. Techniques may include suspending multiplexing and assembly of at least one service data unit (SDU) of the MAC entity.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment. The method disclosed herein may be performed in any sequence, and are not limited to the sequence shown in any particular embodiment.

Figure 1:
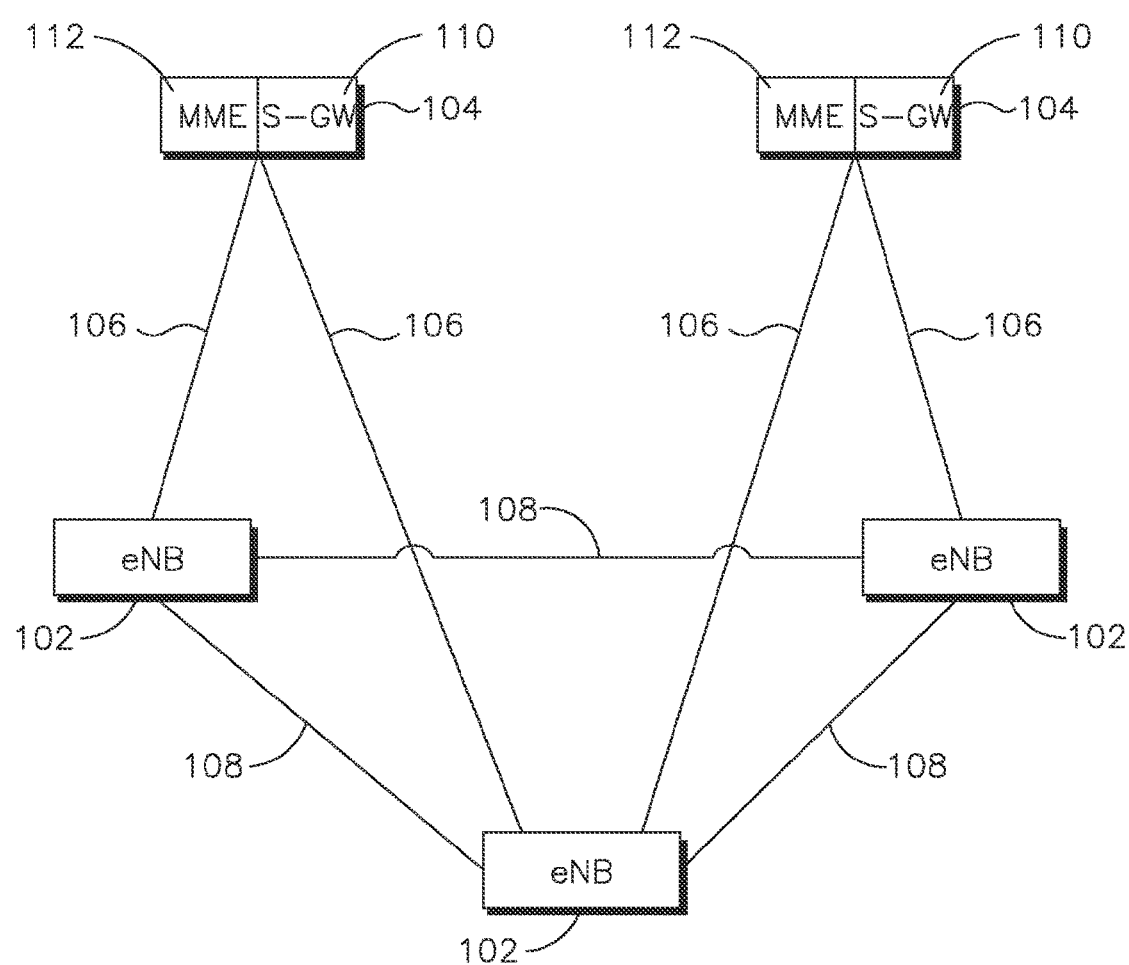
FIG. 1 shows an overview of an Evolved Universal Mobile Telecommunications System (UMTS) Terrestrial Radio Access Network (E-UTRAN) in accordance with the prior art.
Figure 2:
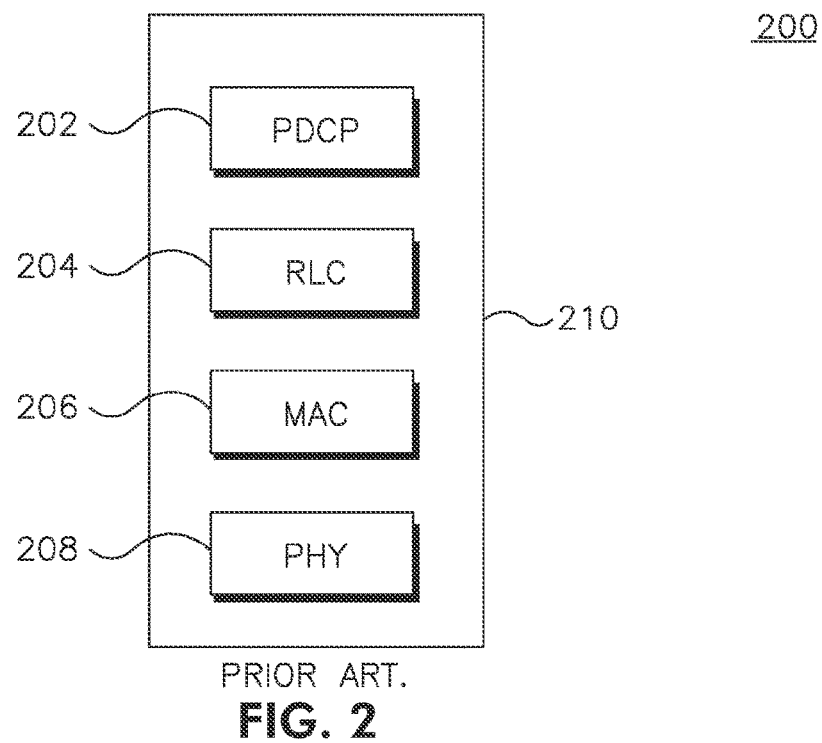
FIG. 2 shows an LTE user-plane protocol stack in accordance with the prior art.
Figure 3:
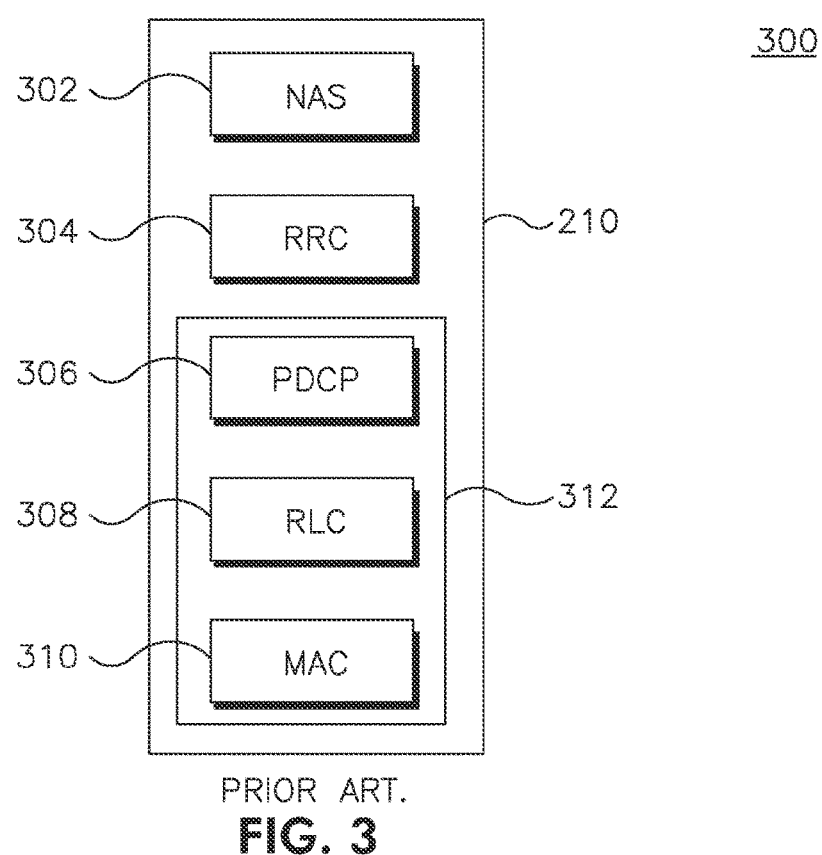
FIG. 3 shows an LTE control plane protocol stack of the WTRU of FIG. 2.
Figure 4:
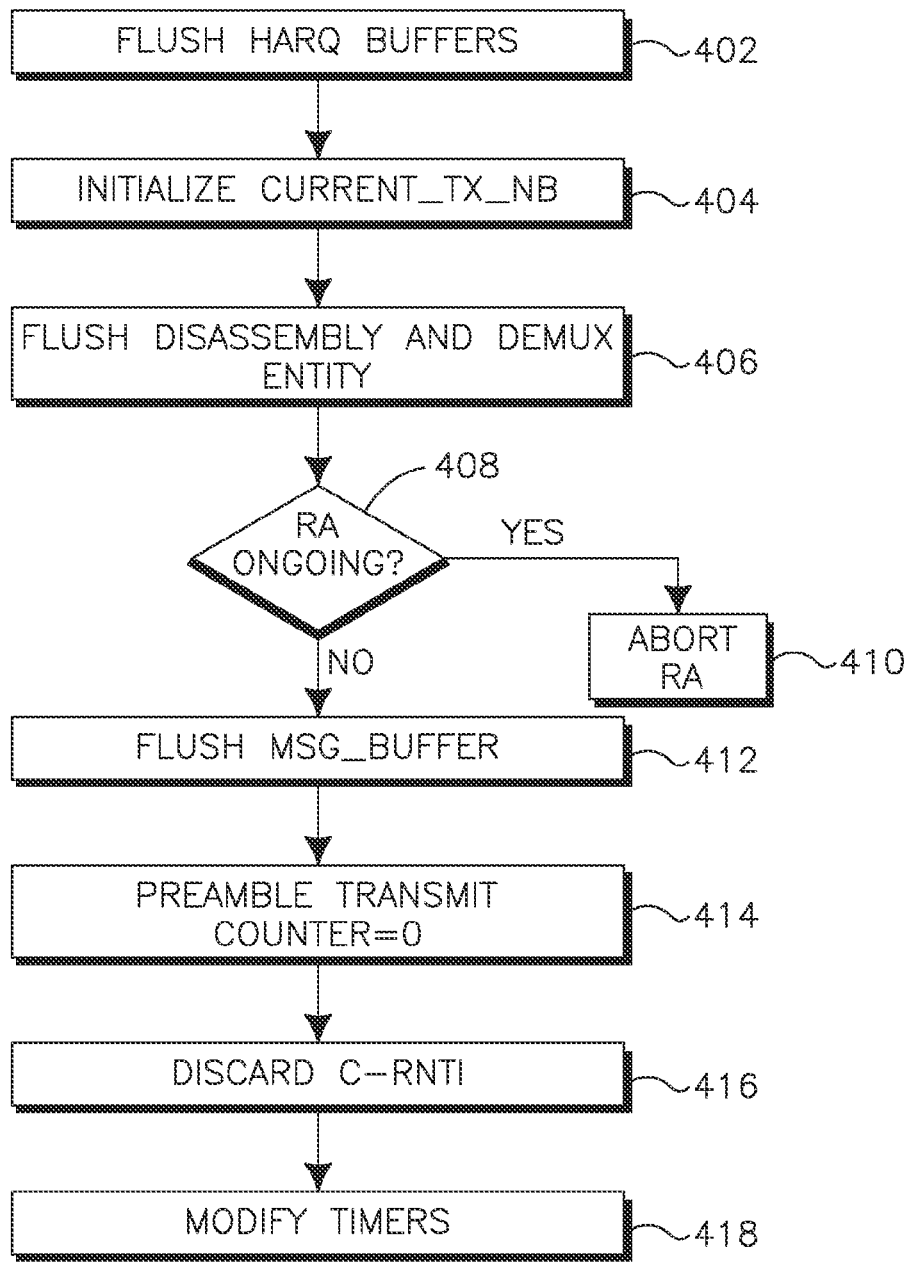
FIG. 4 shows a method of resetting a MAC entity in accordance with the prior art.
Figure 5:
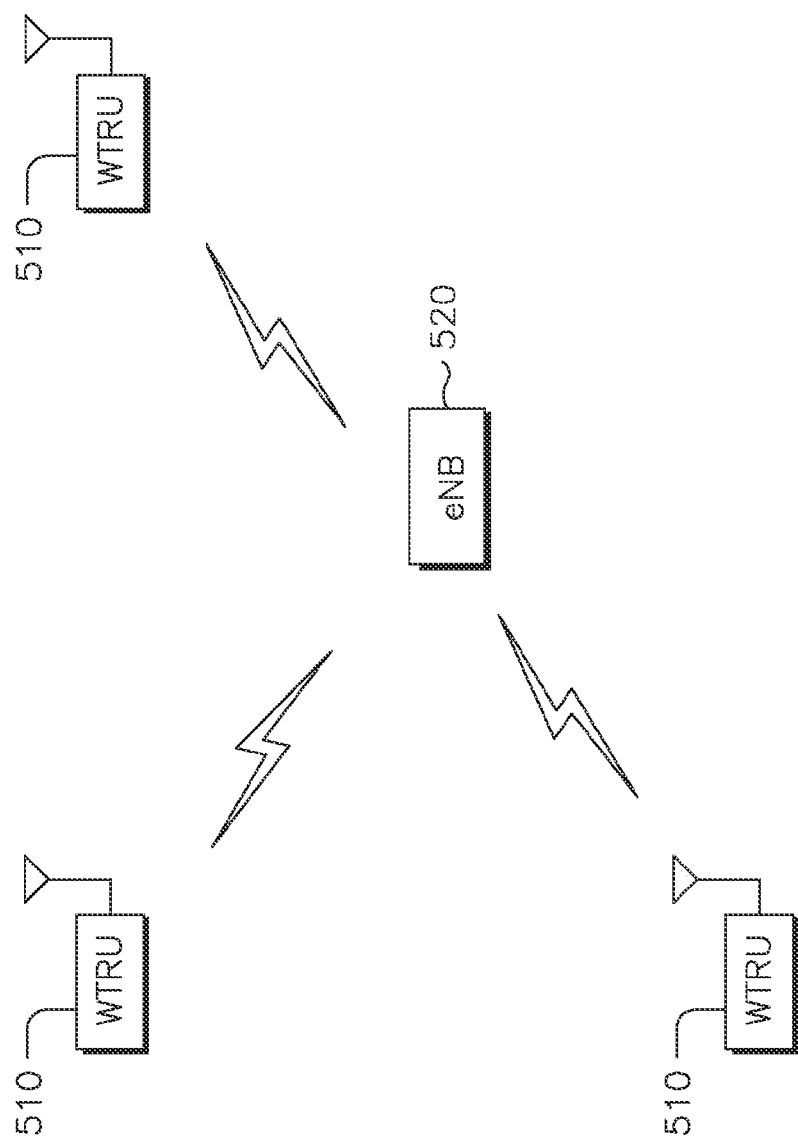
FIG. 5 shows a wireless communication system including a plurality of WTRUs and an e Node B (eNB)

FIG. 5 shows a wireless communication system 500 including a plurality of WTRUs 510 and an e Node B (eNB) 520. As shown in FIG. 5, the WTRUs 510 are in communication with the eNB 520. Although three WTRUs 510 and one eNB 520 are shown in FIG. 5, it should be noted that any combination of wireless and wired devices may be included in the wireless communication system 500.

Figure 6:
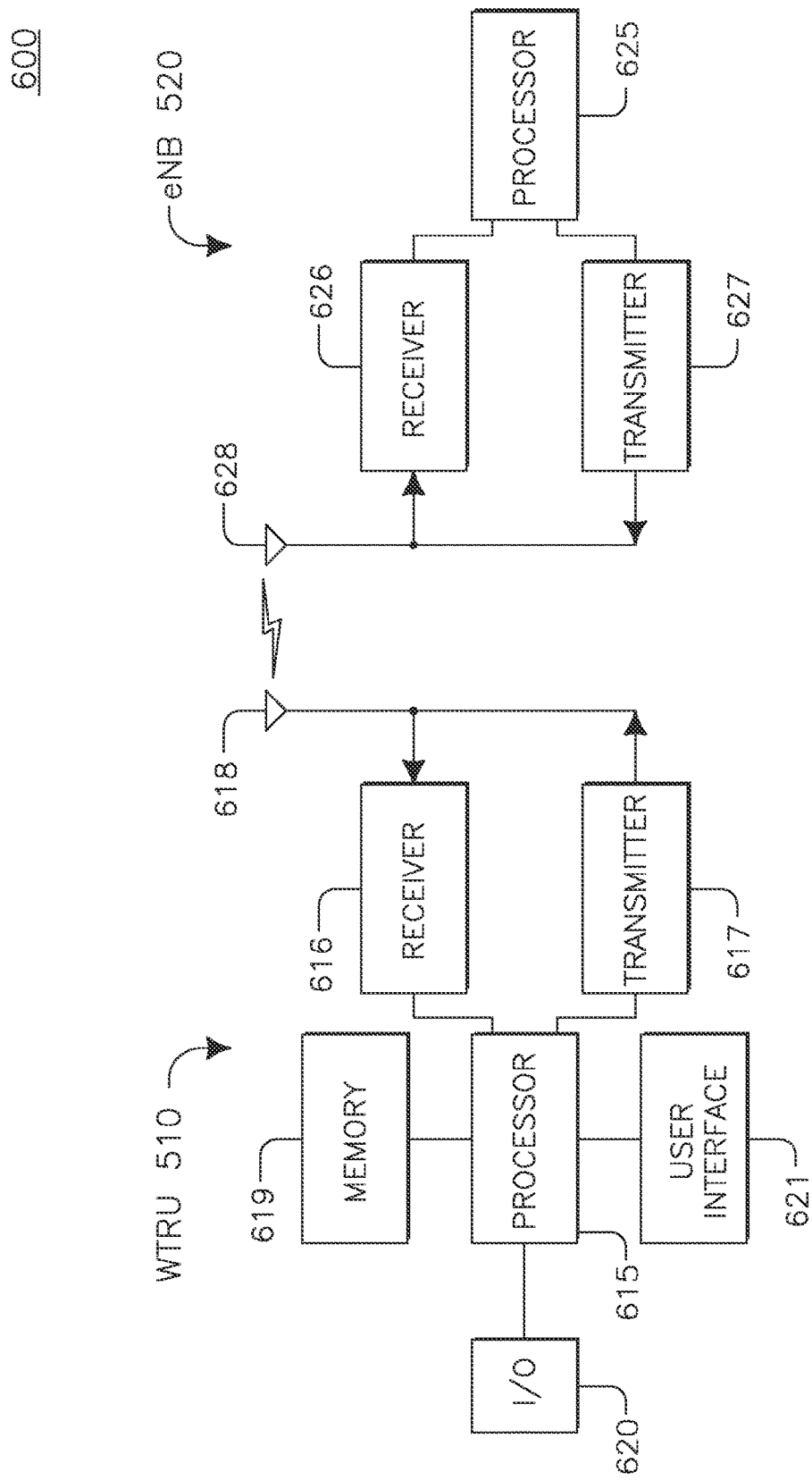
FIG. 6 is a functional block diagram of the WTRU and the eNB of the wireless communication system of FIG. 5.

FIG. 6 is a functional block diagram 600 of a WTRU 510 and the eNB 520 of the wireless communication system 500 of FIG. 5. As shown in FIG. 5, the WTRU 510 is in communication with the eNB 520. The WTRU 510 is configured with a PHY entity, MAC entity, RRC entity and an RLC entity. The WTRU 510 is further configured to receive and transmit messages to and from, respectively, each of the entities.

In addition to the components that may be found in a typical WTRU, the WTRU 510 includes a processor 615, a receiver 616, a transmitter 617, and an antenna 618. The WTRU 510 may also include a user interface 618, which may include, but is not limited to, an LCD or LED screen, a touch screen, a keyboard, a stylus, or any other typical input/output device. The WTRU 510 may also include memory 619, both volatile and non-volatile as well as interfaces 620 to other WTRU's, such as USB ports, serial ports and the like. The receiver 616 and the transmitter 617 are in communication with the processor 615. The antenna 618 is in communication with both the receiver 616 and the transmitter 617 to facilitate the transmission and reception of wireless data.

In addition to the components that may be found in a typical eNB, the eNB 520 includes a processor 625, a receiver 626, a transmitter 627, and an antenna 628. The receiver 626 and the transmitter 627 are in communication with the processor 625. The antenna 628 is in communication with both the receiver 626 and the transmitter 627 to facilitate the transmission and reception of wireless data. The eNB 520 is configured with a PHY entity, a MAC entity and an RRC entity.

MAC Reconfiguration

An RRC entity may reconfigure a MAC entity. To begin the process, the MAC entity may send a signal to the RRC entity to request, or trigger, the reconfiguration. Any one of the events listed below may cause the MAC to request that the RRC send a reconfiguration command to the MAC:

a. a predetermined threshold number of random access channel (RACH) re-tries has been reached;
b. the reserved dedicated RACH preambles expire;
c. SPS transitions from the talk-spurt period to the silent period;
d. SPS transitions from the silent period to talk-spurt period;
e. the discontinuous reception (DRX) function loses synchronization between the WTRU and the eNB;
f. a failure of the transmission time interval (TTI) bundling retransmissions;
g. the number of retransmissions of data exceeds the maximum number of retransmissions allowed; and
h. one or more of the WTRU's buffers is full or about to become full (as determined using one or more thresholds), including, but not limited to the overall buffer, a per-logical-channel buffer; a MAC buffer or an upper-layer buffer.

The MAC reconfiguration procedure may be initiated by the WTRU by transmitting a reconfiguration request to the eNB, for example. The WTRU may transmit the MAC reconfiguration request to the eNB through an RRC or a MAC communication element (CE). The reconfiguration request may include a cause value that indicates the reason for the MAC reconfiguration request, identification of the MAC entity to be reconfigured, an indication of the functions to be reconfigured and an indication of the parameters to be reconfigured Alternatively, the reconfiguration procedure may be initiated by the eNB and signaled to the WTRU. The eNB may transmit an RRC message/information element (IE) to the WTRU. In response, the WTRU may perform MAC reconfiguration based on the information indicated in the RRC message.

Figure 7:
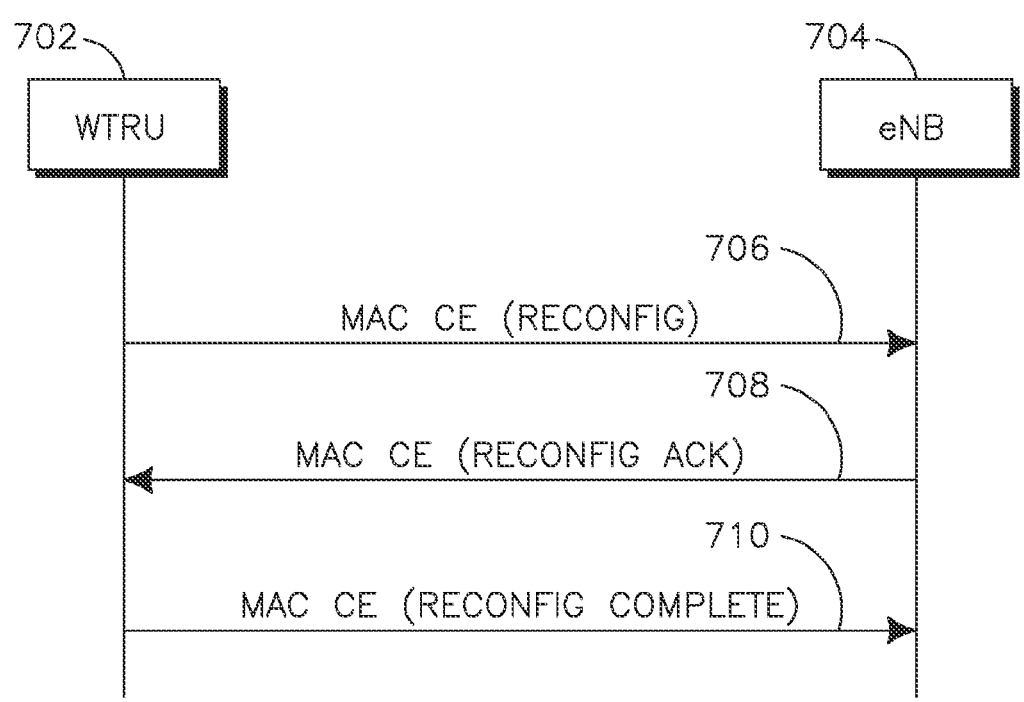
FIG. 7 is a signal diagram of a method for MAC reconfiguration in accordance with an embodiment.

FIG. 7 is a signal diagram of a method for MAC reconfiguration 700 in accordance with an embodiment. As shown in FIG. 7, a WTRU 702 and an eNB 704 may send and receive MAC CEs (706, 708, 710) to reconfigure the MAC entity. The MAC CEs (706, 708, 710) may be used when MAC reconfiguration is requested from the MAC entity of the WTRU 702. The MAC CEs (706, 708, 710) include a MAC CE to request MAC reconfiguration 706, a MAC CE to acknowledge reception of MAC reconfiguration 708, and a MAC CE to confirm the completion of MAC reconfiguration process 710. The MAC CE may also contain the reconfiguration parameters.

Figure 8:
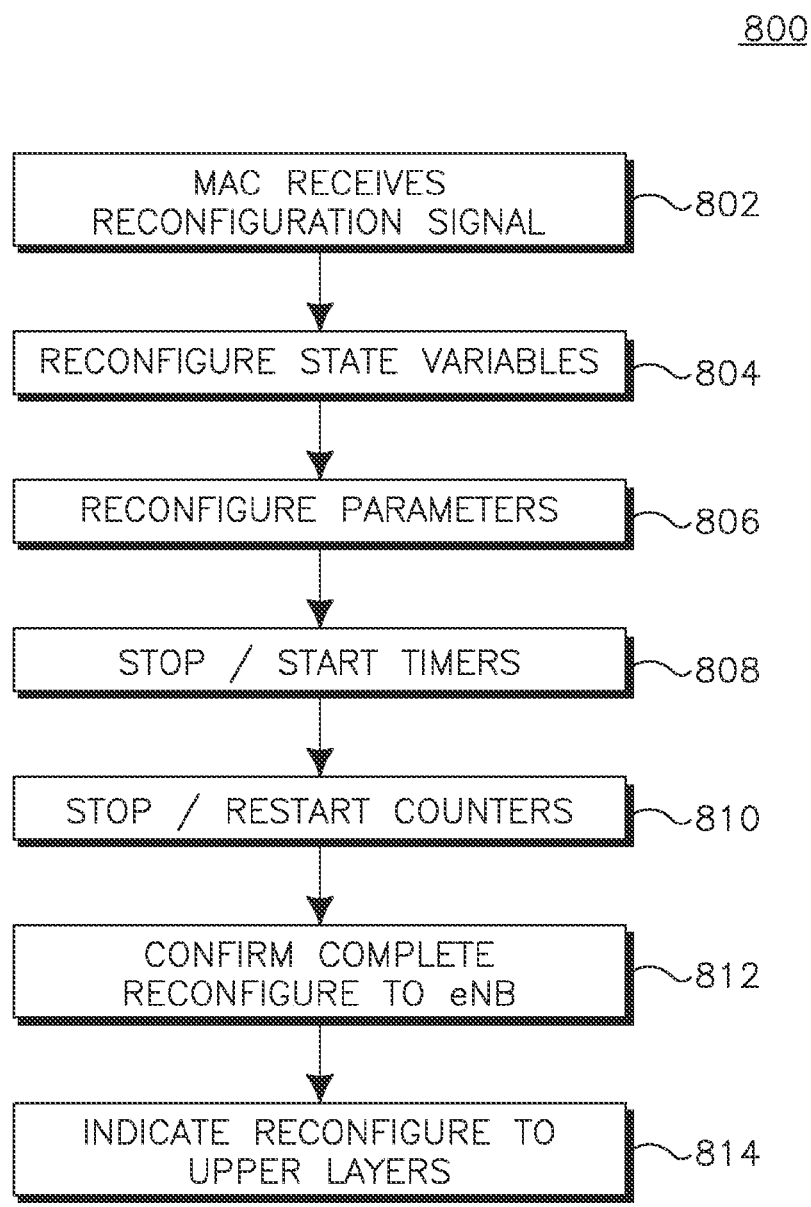
FIG. 8 shows a method of MAC reconfiguration in accordance with an embodiment.

FIG. 8 shows a method of MAC reconfiguration 800 in accordance with an embodiment. At step 802, the MAC entity in a WTRU receives an RRC signal or a MAC CE indicating that the MAC should reconfigure its parameters. At step 804, the MAC entity reconfigures MAC state variables to their initial values, default values, or values that are included in the MAC CE or RRC signal. At step 806 the MAC entity reconfigures MAC parameters to values that are included in the MAC CE or RRC signal. At step 808 the WTRU starts, stops or restarts timers associated with the reconfigured functions of the MAC entity, such as the on-duration timer and inactivity timer associated with reconfiguring a DRX cycle, for example. At step 810, the WTRU stops and/or restarts counters associated with the reconfigured functions of the MAC entity, such as the number of retries of RACH preambles, for example. At step 812, the WTRU confirms completion of the reconfiguration procedures to the eNB and at step 814, the WTRU indicates completion of reconfiguration to the upper layers.

The new values of the parameters of a reconfigured MAC entity may not be applied immediately after the MAC entity receives the new values. The MAC reconfiguration may be synchronized with RRC or MAC CE messaging. The RRC or MAC CE messaging may include an explicit or implicit indication of the time of activation of the new parameter values. Alternatively, the activation may be based on a transmission time interval (TTI) or a system frame number (SFN). For example, the RRC or MAC CE messaging may be synchronized with the new value activation which may be aligned with a SFN or a number of TTIs relative to the last TTI in which the RRC or MAC CE message was transmitted or received.

Figure 9:
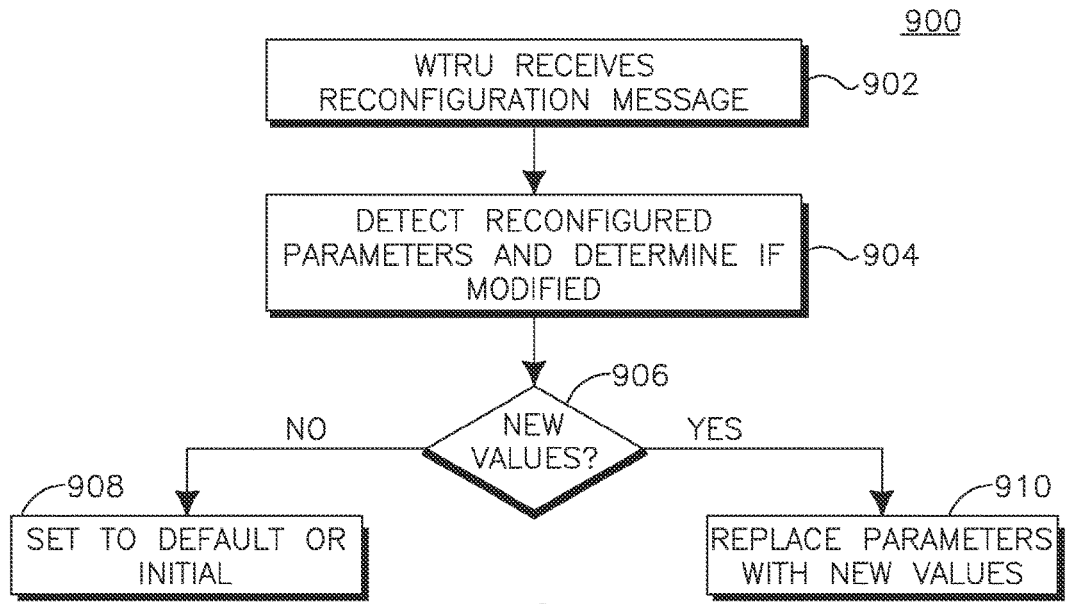
FIG. 9 shows a method of reconfiguring RACH or DRX parameters in accordance with an embodiment.

FIG. 9 shows a method of reconfiguring RACH or DRX parameters 900 in accordance with an embodiment. At step 902 the WTRU receives a reconfiguration message for RACH or DRX parameters. At step 904, the WTRU reads the reconfigured RACH or DRX parameters from the reconfiguration message and determines if the reconfigured parameters are modified values. At step 906, the WTRU determines if the requested parameters are configured to new values. If the requested parameters are not configured to new values, at step 908 the WTRU resets the requested parameters to initial or default values. Otherwise, at step 910, the WTRU replaces the old parameter values with the new parameter values.

If the new parameter values are for the RACH, the values are applied the next time a RACH procedure is initiated. The WTRU may also be configured to apply new parameters for the dedicated RACH procedure when the WTRU and the eNode-B are synchronized.

For new DRX timer values, the WTRU may apply the new parameters in the next TTI or it may wait until the old timer expires and apply the new timer value when the timer is initiated.

Figure 10:
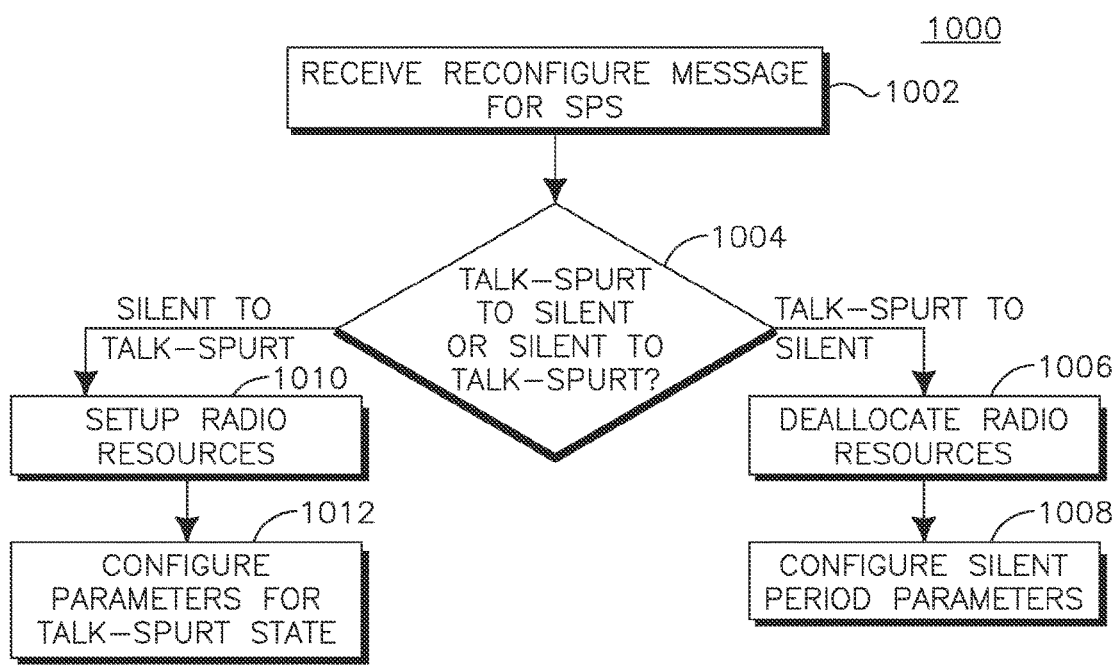
FIG. 10 shows a method of reconfiguring SPS parameters in accordance with an embodiment.

FIG. 10 shows a method of reconfiguring SPS parameters 1000 in accordance with an embodiment. At step 1002, the WTRU receives reconfiguration message for SPS. At step 1004, the WTRU detects if the reconfiguration is for a transition from a talk-spurt state to a silent state, or from silent state to talk-spurt state. If the transition is from talk-spurt to silent state, at step 1006, the WTRU deallocates the radio resource configured for the talk-spurt state, and, at step 1008, the WTRU configures the radio resource or parameters used for a silent period.

If, at step 1004, the WTRU detects the reconfiguration is from talk-spurt state to silent state, at step 1010 the WTRU sets up the radio resource. At step 1012 the WTRU configures the parameters for the talk-spurt state.

The deallocation for the old configuration and the configuration of the new parameter values may be performed in next immediate TTI. Alternatively the timing of the activation of the values for the reconfigured parameters may be based on an activation time conveyed in the reconfiguration message.

If a WTRU detects the reconfiguration is for the parameters of existing talk-spurt period or if the reconfiguration is for the extension of current talk-spurt period, then the WTRU may continue the persistent transmission after the expiration of the current configuration. Alternatively, if parameters are reconfigured for an extension of current talk-spurt period, the new parameters should be used in the extended persistent transmission period.

When a WTRU receives a reconfiguration message for a HARQ process, then the WTRU may flush the HARQ buffer for the configured HARQ process. Next, it may initialize the CURRENT_TX_NB to zero for configured HARQ process. And finally the WTRU may apply the reconfigured values in the next TTI or based on the activation time indicated in the reconfiguration message.

MAC Reset

For a MAC reset, the MAC entity may indicate to the RRC entity that a MAC reset is required. The reasons for a MAC reset may be different than the reasons for a MAC reconfiguration. A MAC reset may be triggered by a handover, cell-reselection or an RRC state transition from connected mode to idle mode, for example. Other triggers for a MAC reset may include:

a) reaching a predetermined number of RACH retries;
b) expiry of reserved dedicated RACH preambles;
c) the DRX function losing synchronization between the WTRU and the eNB;
d) a number of retransmissions of data exceeding the maximum number of retransmissions allowed;
e) a radio link failure;
f) a handover command is transmitted indicating a MAC reset;
g) a measurement indicates that a neighboring cell provides better signal quality than the source cell and the WTRU decides to transmit handover request;
h) a measurement indicates that a neighbor cell provides better signal quality than the source cell and WTRU decides to perform cell reselection;
i) a number of retransmissions of control elements (CE's) exceeds a maximum number of retransmissions allowed; and/or
j) token buckets (used for PBR or Aggregate-MBR) exhibit problems, such as, one or more token buckets remain less than or equal to zero (0) for more than a specified time/threshold and/or one or more of the WTRU's buffers is full or about to become full, for example.

Other events may also trigger a MAC reset.

Figure 11:
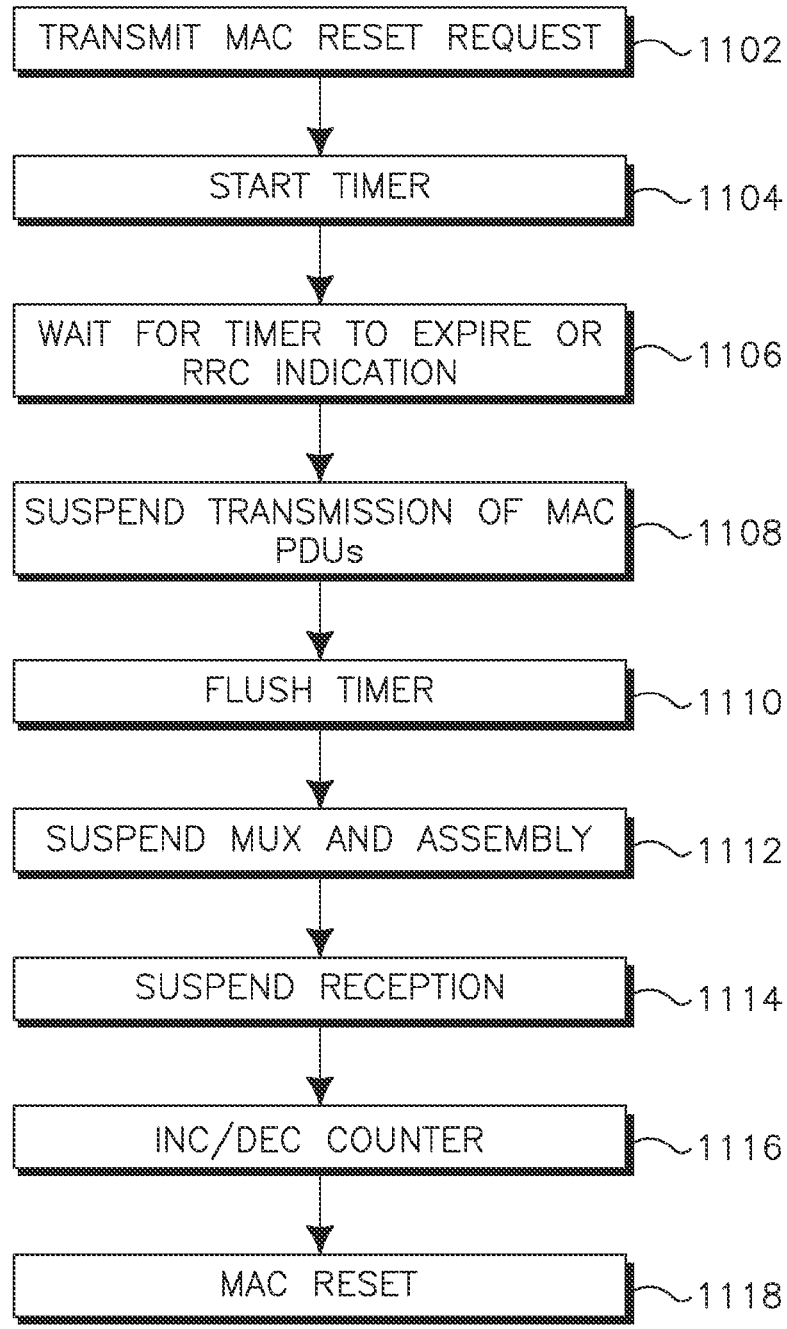
FIG. 11 shows a method for a MAC reset in accordance with an embodiment.

FIG. 11 shows a method for a MAC reset 1100 in accordance with an embodiment. At step 1102, the MAC entity transmits a MAC reset request to the RRC. At step 1104 a timer (Tmac_reset) is started. The timer may be specific to each MAC entity. At step 1106 the WTRU may wait for the timer to expire or wait for an indication from the RRC entity. The indication from the RRC entity may be an acknowledgement of the reset request and/or confirmation of the reset procedures being initiated by the RRC. At step 1108, the WTRU suspends transmission of any MAC PDUs from the entity being reset. At step 1110, the WTRU flushes the buffer of any MAC SDUs sent before the reset. At step 1112, the WTRU suspends the multiplexing and assembly of MAC SDUs. At step 1114, the WTRU suspends reception of any MAC PDUs by the MAC entity being reset. This can occur by discarding any received MAC PDUs. At step 1116 a counter (Cmac_reset) is incremented or decremented. The counter keeps a count of the number of reset requests. This counter may be specific to each MAC entity. At step 1118 the WTRU resets the parameters of the MAC entity to their initial configured values.

Figure 12:
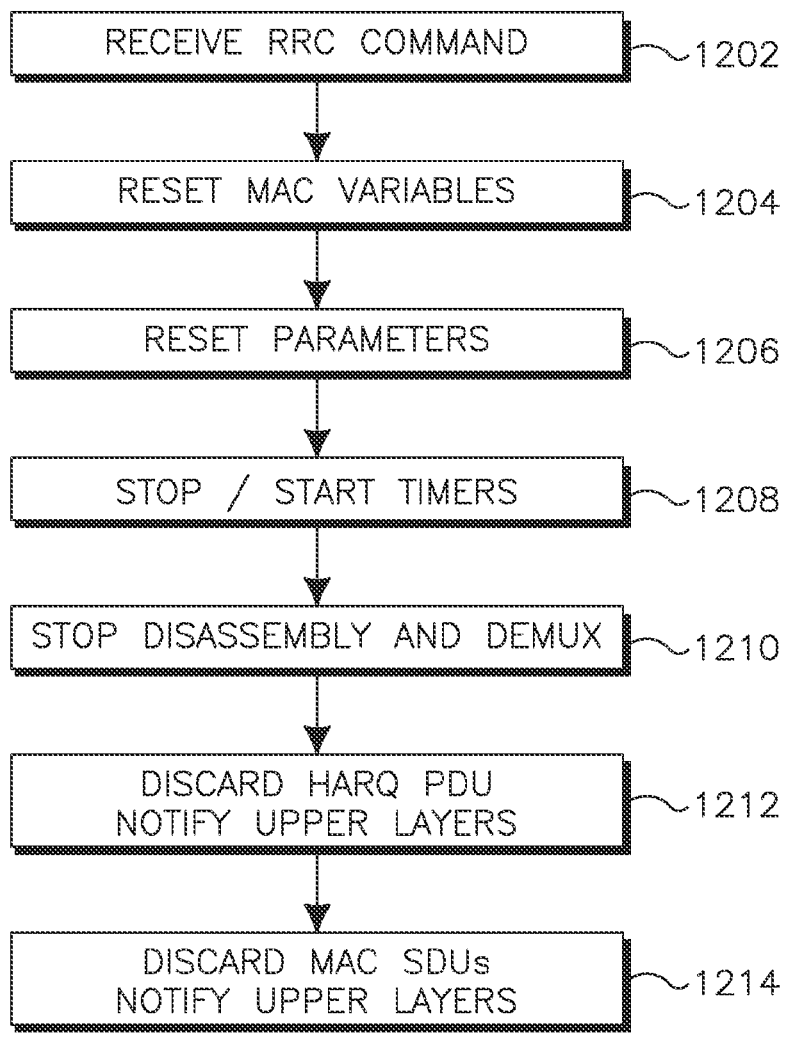
FIG. 12 shows a method for a MAC reset in accordance with another embodiment.

FIG. 12 shows a method for a MAC reset in accordance with another embodiment. In FIG. 12, at step 1202, a receiving MAC entity receives a command from a receiving RRC entity to reset the MAC entity. At step 1204, the WTRU resets at least one MAC state variable to its initial/default value or to the value configured in the reset request. At step 1206, the WTRU resets configurable parameters to their configured values or to a new value received in the reset request. At step 1208, timers associated with the MAC entity are stopped and/or restarted as required. At step 1210, A WTRU stops disassembly and demultiplexing. At step 1212, the WTRU discards HARQ PDUs from the HARQ transmit buffer in the transmitting side of the MAC entity and notifies the upper layers of the discarded corresponding MAC SDUs. At step 1214 the WTRU discards MAC SDUs from the SDU transmit buffer in the transmitting side of the MAC entity and notifies the upper layers of the discarded SDUs.

After receiving the notification, an upper layer, such as the RLC entity, for example, may resubmit SDUs for transmission to the MAC entity below it, following the completion of the MAC reset. In the transmitting side of the MAC entity, MAC SDUs are not discarded from the SDU transmit buffer of the MAC entity. The upper layers are notified about all SDUs whose reception has not been acknowledged by the peer MAC entity, such as through a HARQ ACK, for example. After receiving notification, the upper layer may resubmit those SDUs to the MAC entity for transmission. The MAC entity may confirm completion of the reset procedures to the RRC and indicate the completion of reset to upper layers. These actions may also be performed immediately after the MAC provides an indication to the RRC.

The eNB may include a C-RNTI in a MAC reset message. After a radio link failure, the WTRU may receive a MAC reset message and detect that the C-RNTI is the same as the original source cell. The WTRU may then determine that it is communicating with the same cell as before the radio link failure and does not need to override the previously configured parameters. However, if the WTRU detects a different C-RNTI, then the WTRU may determine that it is communicating with a different cell and the original parameters should be reset with newly configured parameters.

The timing of the MAC reset may be synchronized with RRC messaging. The RRC messaging may include an explicit or implicit indication of the timing of the reset or the activation of reset. Alternatively, the timing of the reset may be accomplished on a TTI or SFN basis. For example, the synchronization between the RRC messaging and the MAC reset may be aligned with the SFN or a number of TTI's relative to the last TTI in which the RRC message was transmitted or received.

Figure 13:
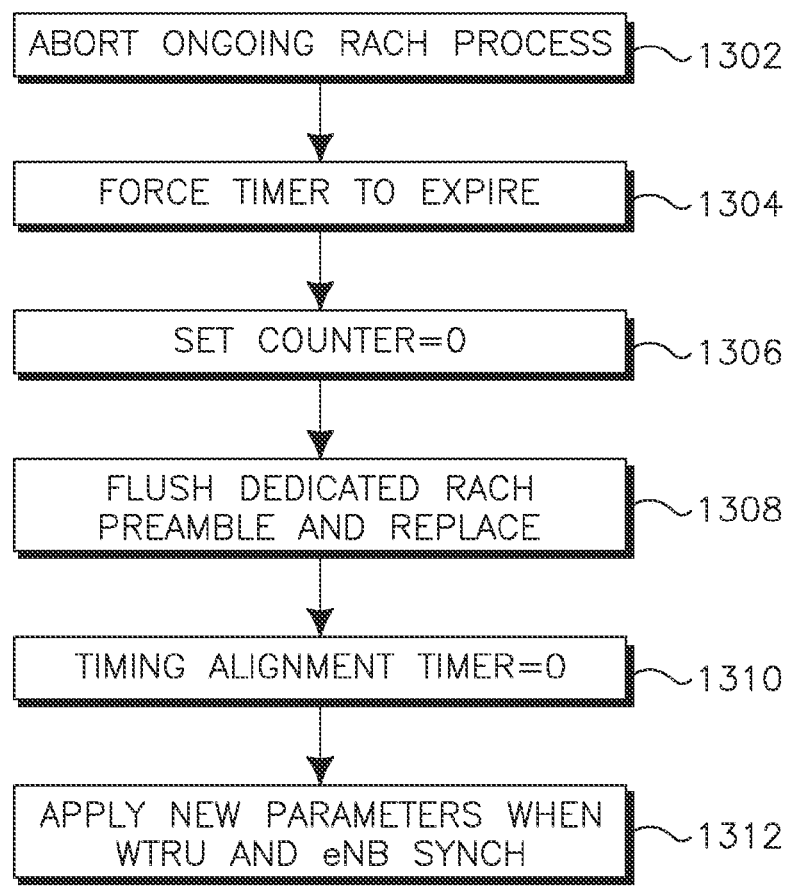
FIG. 13 shows a method resetting RACH parameters in accordance with an embodiment.

When an eNB resets a MAC entity in a WTRU, the MAC reset procedure may include a reset of specific MAC functions, such as SPS, DRX or RACH, for example. FIG. 13 shows a method for a dedicated RACH reset 1300 in accordance with an embodiment. At step 1302 the WTRU aborts the ongoing dedicated RACH process. At step 1304 the WTRU forces the timer for the reserved dedicated RACH preamble to expire. At step 1306 the dedicated preamble transmission counter is initialized to zero. At step 1308 the reserved dedicated RACH preamble is flushed and replaced with a new preamble. At step 1310 the timing alignment timer is treated as if it is expired. At step 1312 the new parameters for the dedicated RACH procedure are applied when the WTRU and the eNB are synchronized.

Figure 14:
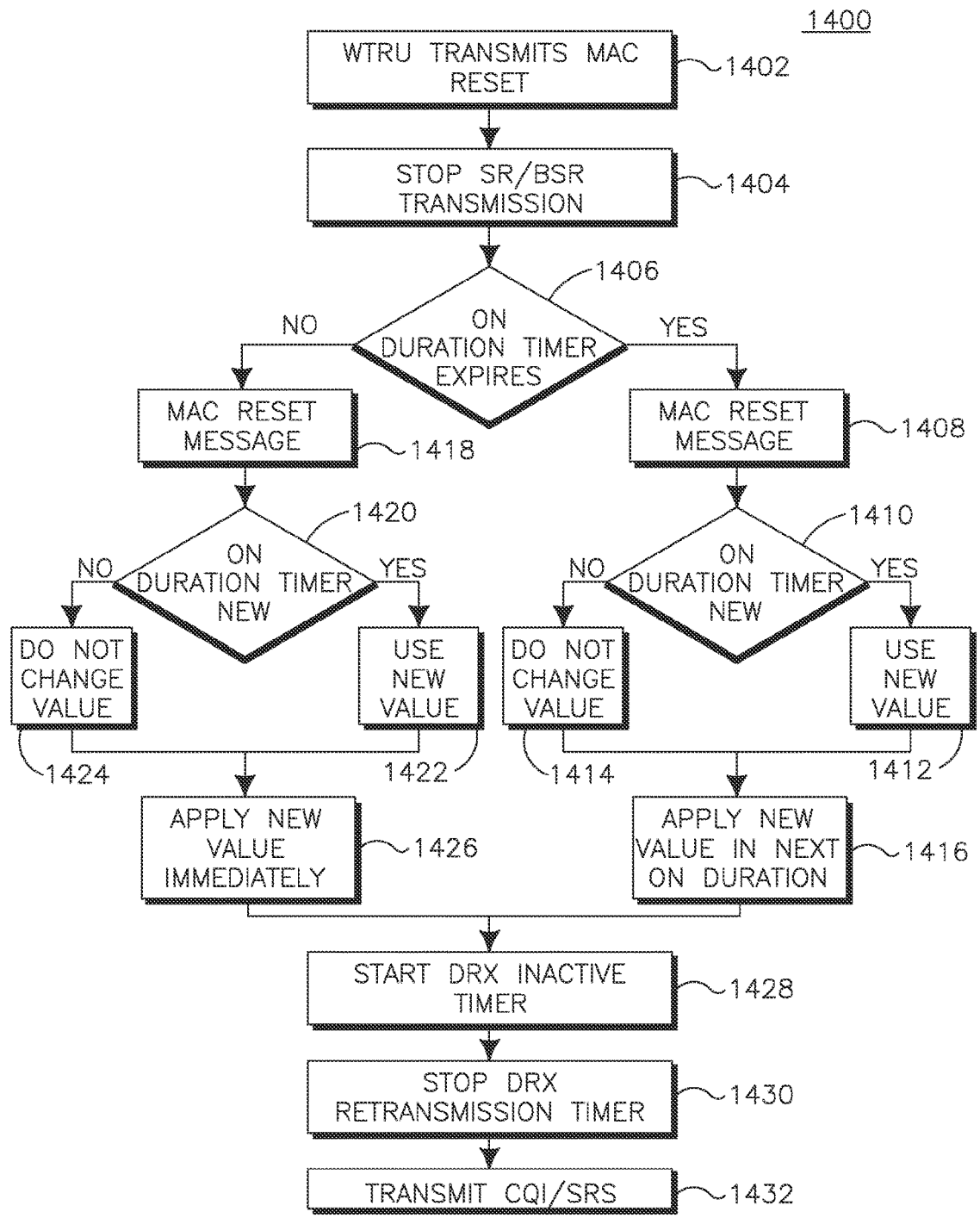
FIG. 14 shows a method for resetting DRX parameters in accordance with an embodiment.

FIG. 14 shows a method for a DRX reset 1400 in accordance with an embodiment. At step 1402 the WTRU transmits the MAC reset indication to a higher layer. At step 1404 the WTRU stops transmitting SR/BSR to the eNB. At step 1406, the WTRU determines if the on-duration timer has expired. If so, at step 1408, the WTRU detects the MAC reset message. At step 1410 the WTRU determines if the on-duration timer value has been reset to a new value. If so, at step 1412, the new value is applied. If not, at step 1414, the old value is left unchanged. At step 1416, all new values are applied at the start of the next on-duration.

At step 1406, if the on-duration timer has not expiree before the WTRU receives the MAC reset message, at step 1418 the WTRU detects the MAC reset message. At step 1420 the WTRU determines if the on-duration timer value has been reset to a new value. If so, at step 1422, the new value is applied. If not, at step 1424, the old value is left unchanged. At step 1426, the new values for all parameters are applied immediately in the current TTI or from the next TTI by considering the elapsed on-duration period.

At step 1428, the WTRU starts the DRX inactivity timer with either a new value or original value when it receives a PDCCH transmission, or needs to transmit SR. Alternatively it may restart the DRX inactivity timer from current TTI or next TTI if WTRU receives MAC reset message while it is running.

At step 1430, the WTRU stops the DRX retransmission timer if running. If a new value is reset then it will apply a new timer value when it is started in the future. Also, the WTRU may stop the DRX short cycle timer if running. If a new value is reset then it will apply a new timer value when it is started in the future. Also, the WTRU will stop the DRX long cycle timer if it is running. If a new value is reset then the new timer value is applied when it is started in the future. Finally, at step 1432, the WTRU transmits a channel quality indicator (CQI)/SRS according the new timing and active time duration.

Figure 15:
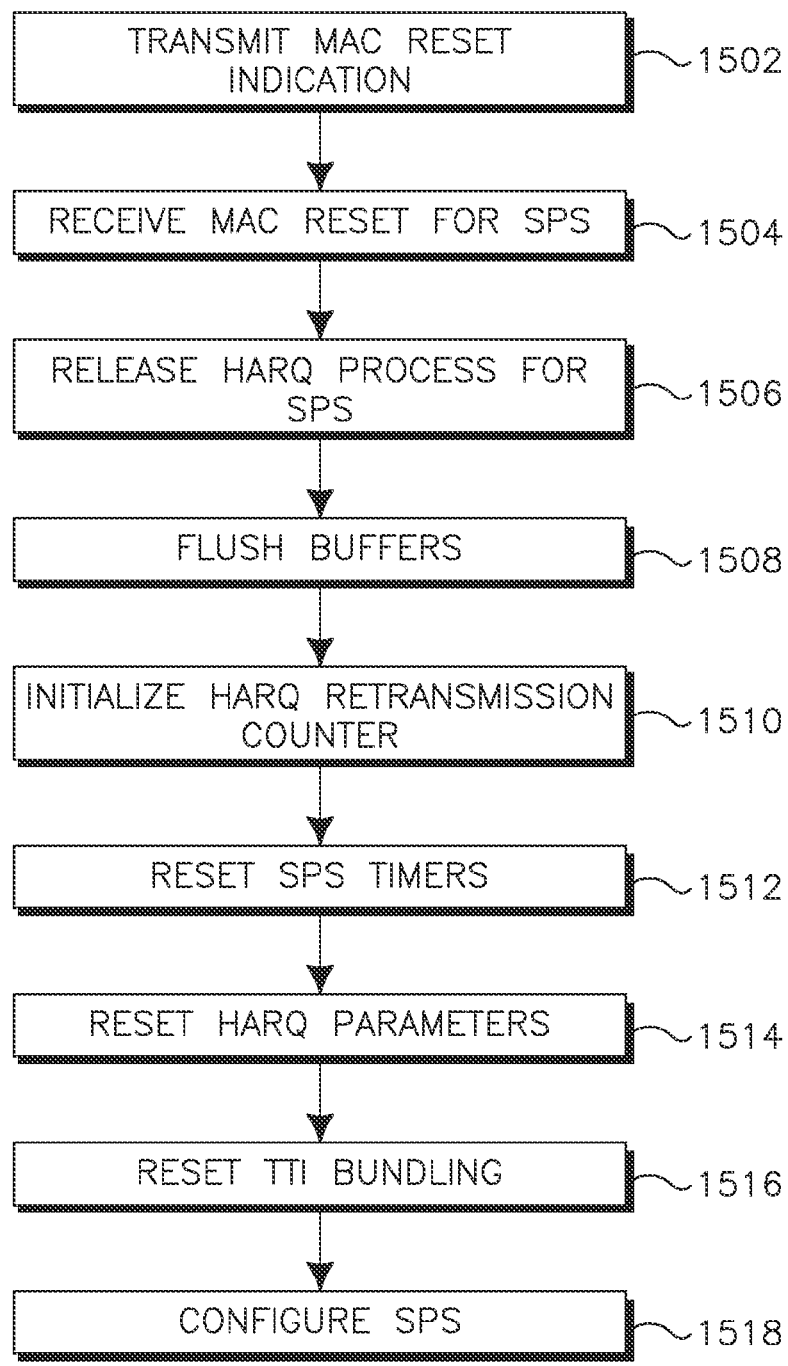
FIG. 15 shows a method for resetting SPS parameters in accordance with an embodiment.

FIG. 15 shows a method for SPS reset 1500 in accordance with an embodiment. At step 1502 the WTRU transmits a MAC reset indication to an upper layer and optionally stops current SPS transmission. At step 1504, the WTRU receives a MAC reset message for SPS. At step 1506 the WTRU releases all of the reserved HARQ processes for SPS. At step 1508 the WTRU flushes the buffers of all the reserved HARQ processes. At step 1510, the WTRU initializes the counter for retransmissions of all reserved HARQ processes. At step 1512 the WTRU resets all timers related to SPS. At step 1514 the WTRU resets the parameters for all reserved HARQ processes. At step 1516 the WTRU resets the TTI bundling parameters used for SPS, such as the number of TTIs used for bundling and RV values, for example. At step 1518 the WTRU configures SPS with new HARQ IDs.

For uplink (UL) SPS after the WTRU transmits a MAC reset indication to an upper layer, the WTRU may suspend all UL SPS transmission and wait for the reset message.

Figure 16:
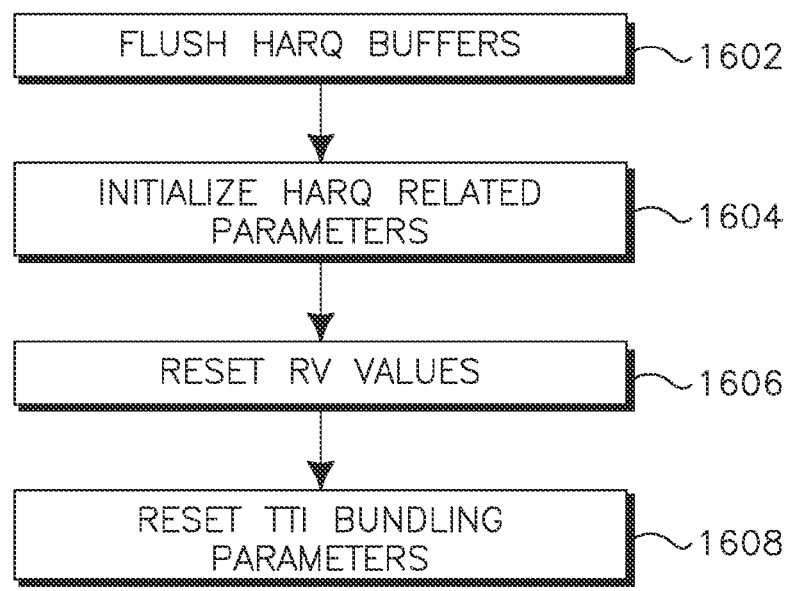
FIG. 16 shows a method for resetting HARQ parameters in accordance with an embodiment.

FIG. 16 shows a general HARQ process for MAC reset in accordance with an embodiment. At step 1602, the WTRU flushes HARQ buffers. At step 1604, the WTRU initializes all HARQ related parameters such as number of retransmissions. At step 1606, the WTRU resets RV values. At step 1608 the WTRU resets TTI bundling parameters.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit receive unit (WTRU) configured to reset a medium access control (MAC) entity, the WTRU comprising:
   a processor, the processor configured, at least in part, to:
      detect a MAC reset indication;
      stop all timers of a MAC layer upon the MAC reset being indicated;
      consider a Timing Alignment Timer to be expired upon the MAC reset being indicated; and
      stop an ongoing random access channel (RACH) process upon the MAC reset being indicated.

2. The WTRU of claim 1, wherein the processor is further configured to discard a dedicated RACH preamble upon the MAC reset being indicated.

3. The WTRU of claim 1, wherein the processor is further configured to cancel at least one of: a scheduling request (SR) or a buffer status report (BSR).

4. The WTRU of claim 1, wherein the processor is further configured to flush one or more hybrid automatic repeat request (HARQ) buffers.

5. The WTRU of claim 1, wherein the processor is further configured to initialize one or more hybrid automatic repeat request (HARQ) related number of retransmissions.

6. A method performed by a wireless transmit receive unit (WTRU), the method comprising:
   detecting a medium access control (MAC) reset indication at the WTRU;
   stopping, by the WTRU, all timers of a MAC layer upon the MAC reset being indicated;
   considering, by the WTRU, a Timing Alignment Timer to be expired upon the MAC reset being indicated; and stopping, by the WTRU, an ongoing random access channel (RACH) process upon the MAC reset being indicated.

7. The method of claim 6, further including discarding a dedicated RACH preamble upon the MAC reset being indicated.

8. The method of claim 6, further including canceling at least one of: a scheduling request (SR) or a buffer status report (BSR).

9. The method of claim 6, further including flushing one or more hybrid automatic repeat request (HARQ) buffers.

10. The method of claim 6, further including initializing one or more hybrid automatic repeat request (HARQ) related number of retransmissions.

* * * * *